United States Patent [19]

Garcia

[11] 4,425,470

[45] Jan. 10, 1984

[54] ALKALI METAL SALTS OF LOW MOLECULAR WEIGHT POLYETHYLENE TEREPHTHALATE AS NUCLEATING AGENTS FOR POLYETHYLENE TEREPHTHALATES

[75] Inventor: Dana S. Garcia, Lincoln University, Pa.

[73] Assignee: E. I. Du Pont de Nemours and Company, Wilmington, Del.

[21] Appl. No.: 405,758

[22] Filed: Aug. 6, 1982

[51] Int. Cl.$^3$ .............................................. C08L 67/02
[52] U.S. Cl. ..................................... 525/444; 524/396
[58] Field of Search ................. 525/444; 524/396, 394

[56] References Cited

U.S. PATENT DOCUMENTS

| | | | |
|---|---|---|---|
| 3,516,957 | 6/1970 | Gray | 524/394 |
| 3,553,157 | 1/1971 | Dijkstra et al. | 260/40 |
| 3,575,931 | 4/1971 | Sherman | 260/75 |
| 3,595,818 | 7/1971 | Weissermel et al. | 260/22 |
| 3,761,450 | 9/1973 | Herwig | 525/437 |
| 3,843,615 | 10/1974 | Herwig | 525/444 |
| 4,212,791 | 7/1980 | Avery | 524/310 |
| 4,223,113 | 9/1980 | Bier | 525/444 |
| 4,344,874 | 8/1982 | Akagi | 524/396 |
| 4,351,757 | 9/1982 | Hoeschele | 524/396 |

FOREIGN PATENT DOCUMENTS

| | | |
|---|---|---|
| 21648 | 1/1981 | European Pat. Off. . |
| 25573 | 3/1981 | European Pat. Off. . |
| 31201 | 7/1981 | European Pat. Off. . |
| 46-29977 | 8/1971 | Japan . |
| 1505214 | 3/1978 | United Kingdom . |
| 1505599 | 3/1978 | United Kingdom . |
| 2015014 | 9/1979 | United Kingdom . |

OTHER PUBLICATIONS

Ibbotson et al., Heterogeneous Crystallization of Polyethylene Terephthalate, The British Polymer Journal, vol. 11, Sep. 1979.

Primary Examiner—John C. Bleutge
Assistant Examiner—Patricia Short
Attorney, Agent, or Firm—James A. Costello

[57] ABSTRACT

Alkali metal salts of ethylene terephthalate oligomers as nucleating agents for polyethylene terephthalate; (i) the nucleation process; (ii) a polyethylene terephthalate molding composition; and (iii) the product made by the nucleation process.

5 Claims, No Drawings

ALKALI METAL SALTS OF LOW MOLECULAR WEIGHT POLYETHYLENE TEREPHTHALATE AS NUCLEATING AGENTS FOR POLYETHYLENE TEREPHTHALATES

BACKGROUND OF THE INVENTION

This invention concerns primarily a method for nucleating ethylene terephthalate polymers. The nucleating agents are alkali metal salts of low molecular weight polyethylene terephthalate (hereafter: PET).

PET is used in very large volume in the manufacture of molded plastics, films, and fibers. A well-known problem in connection with use of PET is that it crystallizes relatively slowly under molding conditions compared with other polymeric materials. The rate of crystallization of PET can be increased, that is, the crystallization temperature in the melt can be raised, by incorporating into the molding composition any of a number of materials known as nucleating agents.

By and large, nucleating agents of the prior art that provide significant increases in crystallization temperature also cause undesirable reductions of molecular weight, whereas nucleating agents that do not significantly lower molecular weight tend to have little effect on crystallization behavior. The following publications are representative of the state of this art.

EPA No. 31,201 discloses in Example 2 the reaction of terephthalic acid with ethylene glycol in the presence of sodium hydroxide. This publication is believed to teach the making of a sodium salt nucleating agent in situ.

EPA No. 21,648 discloses reaction of PET with an ionizable metal salt of an organic compound having at least one acidic proton. The ionizable metal salt comprises sodium salts of substituted benzoic acids containing at least one substituent such as nitro, halo, hydroxy, phenyl, or oxyphenyl. In determining the carboxylate end-group content of the nucleated PET, PET polymer samples containing known amounts of $-COO^{\ominus}Na^{\oplus}$ groups were used as standards. There is no disclosure of using these latter materials as nucleating agents.

EPA No. 25,573 discloses a fast-crystallizing polyester composition containing PET copolymerized and/or mixed with a polyoxyalkylene compound containing at least one —COOM group. The compounds can have the structure

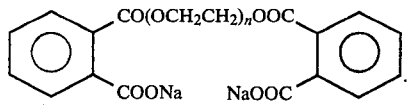

There is no disclosure of such compounds as nucleating agents.

U.S. Pat. No. 3,761,450 discloses lithium and/or sodium salts of aliphatic, cycloaliphatic, aromatic or heterocyclic polycarboxylic acids containing up to 20 carbon atoms as nucleating agents for PET.

GB No. 2,015,014A discloses sodium and potassium salts of selected organic polymers containing pendant carboxyl groups as agents for increasing the rate of crystallization of PET in composite materials.

U.S. Pat. No. 3,516,957 discloses alkali metal salts and alkaline earth metal salts of organic acids having 10 to 25 carbon atoms, e.g., sodium stearate, as nucleating agents for PET.

Japanese Patent application No. 46-29977 discloses sodium benzoate as a nucleating agent for PET.

U.S. Pat. No. 4,212,791 discloses compositions comprising PET, an inert, inorganic, particulate nucleating agent, an oligomer polyester crystallization promoter that does not contain carboxylate moieties, and a segmented thermoplastic copolyester-ether elastomer.

SUMMARY OF THE INVENTION

This invention concerns a method for nucleating PET which method produces polymer characterized by (i) relatively high crystallization temperatures, (ii) relatively rapid crystallization rates, and (iii) relatively slight reductions in molecular weight versus an unnucleated PET control.

The method for nucleating PET comprises melt-blending PET with a nucleating agent comprising an alkali metal salt of an ethylene terephthalate oligomer. The nucleating agent is formed first and then contacted with the PET to be nucleated; the nucleating agent is not formed in situ. It is believed that formation of the nucleating agent outside the PET is the single most important factor in assuring relatively stable PET molecular weights.

This invention also concerns PET molding compositions comprising an admixture of PET and the nucleating agent described herein. This invention also concerns the products made by melt-blending PET with the described nucleating agent, including shaped objects, fibers and films. It should be appreciated that the advantages of this invention will be achieved even when the nucleated PET contains moderate amounts of other copolymer units.

DETAILS OF THE INVENTION

Individual molecules of the nucleating agents employed in the method of this invention have the general formula

wherein M is an alkali metal, preferably sodium, X is —COOM or —CH$_2$CH$_2$OH, and n is about 2 to 130. Typical values for M in a nucleating agent employed in the process of this invention will be about 0.09 to 33 percent by weight depending on the identity of M, the number of —COOM end groups versus —CH$_2$CH$_2$OH end groups, and the value of n. In practice, the alkali metal content will be varied depending on the degree to which the crystallization temperature is to be raised and the degree to which the molecular weight is to be maintained.

When the alkali metal is sodium, the nucleating agent will contain at least about 0.5% by weight of sodium. The minimum values for other alkali metals will be lower or higher, depending on their atomic weights. Because of the way the nucleating agents are made, their molecular weights and related properties such as viscosity will be determined largely by the alkali metal content and will vary inversely with it. The contemplated nucleating agents have inherent viscosities of at least about 0.1 and number-average molecular weights of at least about 1000.

When making a PET molding composition of this invention, the number of gram atoms of alkali metal in the final composition is important. For a given g-atom content, the weight percent of alkali metal will, of course, depend on the atomic number of the metal. When the metal is sodium, a molding composition of the invention will contain at least about 300 ppm (0.03%) by weight thereof, and preferably about 400 to 500 ppm. In formulating a molding composition of the invention, too little nucleating agent will result in an unacceptably small increase in crystallization temperature; whereas too much will result in an unacceptable decrease in molecular weight upon melt-blending. Overall, the concentration of nucleating agent will be about 0.1 to 6% by weight, and preferably about 1% to 3%.

There is no upper limit for the inherent viscosity or molecular weight of the nucleating agent. In practice, of course, neither the viscosity nor the molecular weight will be higher than the value for the PET from which the nucleating agent is made and in fact both values will be lower. The process of introducing alkali metal into the PET to give an effective nucleating agent inherently involves a reduction in molecular weight.

Contemplated nucleating agents are prepared by reacting a solution of amorphous PET in 80:20 methylene chloride:hexafluoroisopropanol with an aqueous solution of an alkali metal hydroxide or an alkanol solution of an alkali metal alkoxide, e.g., sodium methoxide in methanol. Aqueous sodium hydroxide is the preferred reagent. The polymer solution is stirred with a slight excess (up to about 5%) of about 10% to 40% NaOH over that required to reach a basic end point (phenolphthalein). Stirring is preferably continued for several hours after the end point has been reached, and the product is isolated by adding excess methanol, filtering, washing, and drying.

The molecular weight of the starting PET will be as high as possible, and preferably the polymer will have $\overline{M}_n$ of at least about 20,000. This permits introduction of enough combined alkali metal to give an effective nucleating agent without producing an agent of too low molecular weight.

The viscosity and molecular weight of the nucleating agent can be decreased, and the alkali metal content correspondingly increased, by raising the amount of alkali metal hydroxide, and/or the time. Lowering any of these variables will, of course, produce the opposite effects.

A rapid method of estimating the effectiveness of a nucleating agent is to mix approximately equal amounts of PET and the agent in a DSC (differential scanning calorimetry) cup and determine the peak crystallization temperature of the mixture on cooling from the melt by DSC. A more precise method of determining effectiveness is to mix known quantities of PET and nucleating agent, blend the mixture by melt extrusion, and determine the peak crystallization temperature of the product by DSC.

The following Preparations illustrate several methods for making nucleating agents and the following Examples illustrate the invention.

Inherent viscosity, $\eta_{inh}$, is measured at 0.32 g/dl in 25:75 methylene chloride:trifluoroacetic acid at 25° C. Number-average molecular weight, $\overline{M}_n$, and weight-average molecular weight, $\overline{M}_w$, are calculated from GPC (gel permeation chromatography) data determined in m-cresol at 100° C. or in hexafluoroisopropanol at 25° C. Sodium content is determined from atomic absorption spectrum.

PREPARATION A

A. Twenty grams of polyethylene terephthalate pellets (Goodyear, $\eta_{inh}$=inherent viscosity 1.05 dl/g; 0.32 g/dl in 25:75 methylene chloride:trifluoroacetic acid at 25° C.) and 2.026 g sodium benzoate (fine cryo-milled powder) were added to a small jar. The sample was mechanically roll-mixed for 1½ hours and then dried in a vacuum oven with nitrogen bleed at 120° C. for 15 hours. The sample was then extruded, using a CSI Max Mixing ® Extruder, Model CS-194, at 260° C. The extruded sample had $\eta_{inh}$ 0.307 dl/g, $\overline{M}_n$ 12,000, and $\overline{M}_w$ 28,000. $\overline{M}_n$ and $\overline{M}_w$ were determined from GPC (gel permeation chromatography) data in m-cresol at 100° C. The sample contained 0.41% by weight sodium, as determined by atomic absorption, corresponding to 2.57% by weight of sodium benzoate. The peak crystallization temperature (maximum of the exotherm) on cooling from the melt was obtained using a Mettler TA 2000 DSC (differential scanning calorimetry) apparatus. The program cooling rate was 2° C./min. For this product this temperature was 237.6° C., compared with 201.8° C. for extruded polyethylene terephthalate. ($\eta_{inh}$ 0.874 dl/g) in the absence of any additive.

B. A small sample of the extruded product of Part A was cryo-milled and extracted with hot water for 48 hours to remove sodium benzoate. NMR (nuclear magnetic resonance spectroscopy) showed the presence of benzoate-capped ethylene terephthalate oligomers in the sample. The extruded product also contained the sodium salt of PET.

PREPARATION B

A preferred method for making a nucleating agent is described hereafter. Two samples of amorphous polyethylene terephthalate ($\eta_{inh}$ 0.874 dl/g, $\overline{M}_n$=33,000; $\overline{M}_w$=79,000) were dissolved in 80:20 methylene chloride:hexafluoroisopropanol to give about 2% to 3% solutions. One sample was neutralized by addition of aqueous 30% sodium hydroxide at 30° C. until the liquid became basic (phenolphthalein). Both products were precipitated from solution with methanol, filtered and dried. The neutralized product ($\eta_{inh}$ 0.273 dl/g; $\overline{M}_n$ 6300, $\overline{M}_w$ 18,000) had a peak crystallization temperature of 228.2° C., while the unneutralized product ($\eta_{inh}$ 0.776 dl/g, $\overline{M}_n$ 23,000, $\overline{M}_w$ 67,000) the temperature was 218° C. The neutralized product showed a total absence of any acid end groups and 0.63% by weight of sodium. In the unneutralized product, 31 equivalents of acid per $10^6$ g of polymer were detected and 3 ppm of sodium (probably catalysis residue).

PREPARATION C

Amorphous polyethyelene terephthalate ($\eta_{inh}$ 0.874 dl/g; $\overline{M}_n$ 33,000; $\overline{M}_w$ 79,000) was dissolved in 80:20 methylene chloride:hexafluoroisopropanol. The sample was neutralized by addition of an approximately 15% solution of sodium methoxide in methanol at 30° C. until the liquid became basic. The mixture was stirred for 24 hours, and the product was precipitated with methanol, filtered and dried. The inherent viscosity of this sample was 0.311 dl/g, its sodium content was 1.95%, and no acid end groups were present.

PREPARATION D

Substantially as described in Preparation C, amorphous polyethylene terephthalate was neutralized with an aqueous solution of about 30% sodium hydroxide, and the product was separated by filtration and dried. It had $\eta_{inh}$ 0.161 dl/g, $\overline{M}_n$ 1500, and $\overline{M}_w$ 7400. Molecular weights were determined from GPC in hexafluoroisopropanol at 25° C.

PREPARATION E

Substantially as described in Preparation B, a nucleating agent was prepared by neutralizing amorphous polyethylene terephthalate with an aqueous solution of about 10% cesium hydroxide, followed by filtration and drying. The product had $\eta_{inh}$ 0.296 dl/g, $\overline{M}_n$ 8900, $\overline{M}_w$ 21,000, and $T_{pk}$ 228.5° C., 230° C.

EXAMPLE 1

Approximately equal proportions of PET powder ($\eta_{inh}$ 1.005 dl/g) and the nucleating agent of Preparation A were mixed in a DSC cup. The mixture started to crystallize on cooling from the melt around 229° C., compared with 215° C. in the absence of any additive, indicating substantial nucleation.

EXAMPLE 2

Twenty grams of PET and 2 g of the product of Preparation C were mixed and melt-extruded, and the properties of the extrudate were determined. The product had $\eta_{inh}$ 0.661, $\overline{M}_n$ 17,000, $\overline{M}_w$ 47,000, Na 0.15% $T_{pk}$ (peak crystallization temperature) 225.4° C. The GPC for the molecular weights was determined in hexafluoroisopropanol at 25° C.

EXAMPLE 3

Approximately equal parts of powdered PET ($\eta_{inh}$ 1.005 dl/g) and the product of Preparation C were mixed in a DSC cup, and the mixture was melted and cooled as described in Preparation A. The peak temperature of crystallization was 224.8° C. Thus, even under these relatively nonhomogeneous conditions the nucleating ability of the neutralized polymer was evident.

EXAMPLE 4

PET was mixed with varying amounts of the product of Preparation D. The mixtures were melt-extruded, and properties of the blends were determined. The results are summarized in Table 1. GPC for the molecular weights was carried out in hexafluoroisopropanol at 25° C. The first row gives values for the control.

TABLE 1

| g PET | g NA* | NA/ PET % | $\eta_{inh}$ | $\overline{M}_n$ | $\overline{M}_w$ | % Na | $T_{pk}$ °C. |
|---|---|---|---|---|---|---|---|
| — | 0 | 0 | 0.824 | 25,000 | 64,000 | 0 | 205 |
| 20 | 2 | 10 | 0.534 | 13,000 | 32,000 | 1.25 | 233.1 |
| 20 | 1 | 5 | 0.492 | 15,000 | 36,000 | 0.47 | 233.9 |
| 50 | 1.5 | 3 | 0.718 | 22,000 | 65,000 | 0.05 | 235.0 |
| 50 | 0.5 | 1 | 0.777 | 20,000 | 62,000 | 0.04 | 229.1 |

*NA = nucleating agent

EXAMPLES 5 and 6

Five hundred grams of amorphous polyethylene terephthalate ($\eta_{inh}$ about 0.87) were dissolved in 80:20 methylene chloride:hexafluoroisopropanol (4000 ml:1000 ml). Sodium hydroxide solution in water 20% (400 g NaOH, 1600 ml H$_2$O) was added slowly to the polymer solution with stirring until the liquid became basic. The reaction was stirred for an additional 5 to 6 hours. Then, 2000 ml to 3000 ml of methanol was added slowly with stirring until all the polymer was precipitated as a fine powder. The polymer was then filtered by suction, dried in air for 1 to 2 days and milled to a fine powder. Remaining solvent was eliminated using vacuum. Further, the polymer was dried in a vacuum oven with nitrogen bleed at about 120° to 130° C. for at least 3 days. The procedure was repeated 10 times to produce about 4500 to 5000 g of neutralized polymer. Each sample was tested individually $\overline{M}_n$ (inherent viscosity) was 600 to 5000, and sodium (atomic absorption) was 2.25 to 5.51% by weight.

The nucleation efficiency of the material prepared as above was determined in PET. The compositions are given in Table 2. Compositions were extruded on a 1.1 C. (28 mm twin screw extruder). The extruded samples were then molded in an injection molding instrument with screw size of 6 oz. Results are shown in Table 3.

| Example 5 | | Example 6 | |
|---|---|---|---|
| Component | Weight | Component | Weight |
| PET | 9.75 | PET | 9.723 |
| PET—Sodium Salt | 0.044 | PET—Sodium Salt | 0.098 |
| plasticizer | 0.59 | plasticizer | 0.59 |
| epoxy | 0.09 | epoxy | 0.09 |
| antioxidant | 0.015 | antioxidant | 0.015 |
| glass fibers | 4.5 | glass fibers | 4.5 |

In Examples 5 and 6, the plasticizer was n-ortho, para-tallow toluene sulfonamide and the antioxidant was tetrakis(methylene(3,5-di-tert-butyl-4-hydroxyhydro-cinnamate))methane. The polyethylene terephthalate before nucleation had $\overline{M}_n$ of 13,000 and $\overline{M}_w$ of 44,000 by GPC.

TABLE 3*

| Ex- ample | (NaPET) % Based On PET | I.V. | $\overline{M}_n$ GPC | $\overline{M}_w$ GPC | Melt Stability 300° C. | | T°C. |
|---|---|---|---|---|---|---|---|
| | | | | | 6–11 | 16–21 | |
| 5 | 0.5 | 7,500 | 13,000 | 37,500 | −.039 | −.024 | 225 |
| 6 | 1.0 | 6,500 | 13,500 | 37,000 | −.038 | −.038 | 225 |

*The symbols represent the following:
I.V. = The $\overline{M}_n$ from inherent viscosity. $\overline{M}_w$ and $\overline{M}_n$ refer to molecular weights from GPC run in HFIP.
6–11 = Measures of melt stability done in an ACR and (atomic capillary rheometer), measurement of 16–21 viscosity at 6 min–11 min and 16 min–21 min. If degradation occurs, the difference will be large.
T°C. = Crystallization temperature on cooling from the melt, 300° C. to 180° C.

The values supplied under column headings 6–11 and 16–21 indicate that there is no significant melt degradation. The perfect value is 0. As a result of the stability of these compositions in the melt, $\overline{M}_n$ and $\overline{M}_w$ values hold up very well.

The embodiments of the invention in which an exclusive property of privilege is claimed are defined as follows:

1. A method for nucleating polyethylene terephthalate comprising melt-blending polyethylene terephthalate with a nucleating agent comprising an alkali metal salt of ethylene terephthalate oligomer, the method characterized by forming the nucleating agent outside of contact with the polyethylene terephthalate to be nucleated, wherein the nucleating agent has an inherent viscosity of at least about 0.1 dl/g, and a number-average molecular weight of at least about 1000, and wherein an individual molecule of the nucleating agent has the general formula

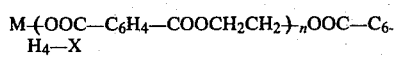

M–(OOC—C$_6$H$_4$—COOCH$_2$CH$_2$)$_n$OOC—C$_6$H$_4$—X wherein M is an alkali metal, X is —COOM or —CH$_2$CH$_2$OH, and n is about 2 to 130.

2. A method according to claim 1 wherein the nucleating agent is added in an amount of about 0.1 to 6 percent based on the total weight of the composition.

3. A method according to claim 1 wherein M is sodium.

4. A method according to claim 3 wherein the nucleating agent comprises at least about 0.5 weight percent of sodium.

5. A method according to claim 4 wherein the nucleating agent has a number average molecular weight of at least about 1,000 and the number average molecular weight of the polyethylene terephthalate to be nucleated is at least about 20,000.

* * * * *